C. E. Bertrand,
Sugar Filter,
No. 13,740.  Patented Oct. 30, 1855.
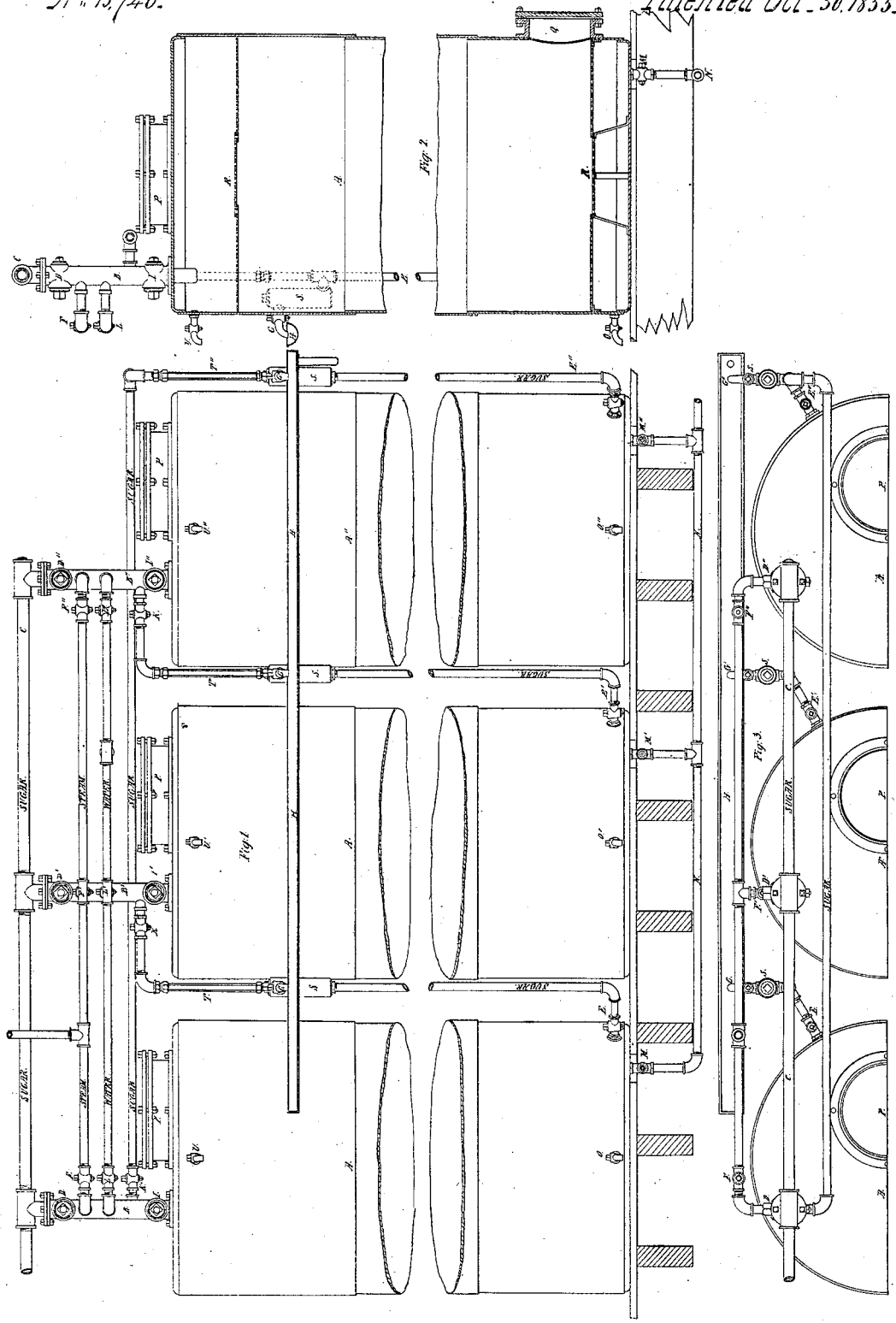

UNITED STATES PATENT OFFICE.

CHARLES E. BERTRAND, OF NEW YORK, N. Y.

IMPROVEMENT IN SUGAR-FILTERS.

Specification forming part of Letters Patent No. 13,740, dated October 30, 1855.

*To all whom it may concern:*

Be it known that I, CHARLES E. BERTRAND, of New York, in the county of New York, in the State of New York, have invented a new and useful Improvement in Sugar-Filters for Sugar-Refineries; and I do hereby declare that the following is a full, clear, and exact description of the construction and operation of the same, reference being had to the annexed model and drawings, making a part of this specification, and the letters of reference marked thereon.

In general terms, the nature of my improvement in sugar-filters for clarifying sugar consists in the combination of a series of three or more vertical recipients, so arranged and connected that communication may be simultaneously established or interrupted between them or either of them, and one, two, or more operated together by causing the solution of sugar, after having passed the clarifying process in the preceding filter, to ascend, owing to its own gravity, into the second, third, or from the third back again into the first one, while the intermediate filters may be renewed for operation and brought into connection again with the system.

It further consists in the combined employment of water and steam as a mechanical means to affect the operating-filters in either direction—that is to say, in a forward and direct way from the top to the bottom of the filter at the commencement, and in a backward direction, or from the bottom to the top—in order to revive the action of the preceding filter by exerting an artificial pressure or reaction upon its bottom surface from the next one following, when accumulation of sediments or of foreign substances contained in the raw sugar has taken place and settled upon the upper strata of the animal charcoal. A choking up of the filter, which so frequently occurs in the present mode of filtering, is therefore wholly impossible in my improved plan of a combined filtering apparatus, for at the slightest indication mechanical expedients can be resorted to at an instant to counteract the tendency of settling of such obstacles.

The advantages gained over the present and imperfect system of filtration with filtering-bags and all their noxious influences consists, first, in the acceleration of the process of clarifying by constantly obtaining a bright and clear filtration with no other chemical expedient but the animal charcoal; second, in the total exhaustion of the available properties of the charcoal by affording an opportunity to keep it free from residue and sediments during the whole process, consequently in the utmost economy of the material employed, and, third, in the washing out and completely unsweetening of the sediments, the residue of the solution of sugar, as well as of the charcoals, by the introduction of steam, and with the least possible quantity of water, before the filters are emptied and recharged.

One great merit of my improvements consists in the exclusion of animal-blood or other albuminous or equivalent substances, which are generally used in the process of clarifying sugar. The disadvantages of using such materials as clarifying ingredients are well known and fully admitted. The effect of blood is not of a chemical nature in its application to the solution of sugar, but simply mechanical, inasmuch as earthy and other extraneous matters contained in the sugar are not separated or analyzed, but merely wrapped up by the coagulated material.

The following will now exhibit the operation of the same with reference to the accompanying drawings.

Figure 1 exhibits an elevation of a series of filters with all their attachments. A sectional view is also given in Fig. 2, to show the inteterior arrangements, while Fig. 3 represents the system in a ground view.

Three main pipes, as will be seen in Fig. 1, are attached to the top of the system. They are all connected and communicate alternatively with the three filters by operating the different stop-cocks. The main pipe C further serves for the introduction of the molasses or solution of sugar into the filters. The second pipe is intended for the admission of steam, and the third one to introduce a stream of water. Now, to commence with the filter A, its interior, between the strainers R R, is, as usual, charged with the required quantity of animal charcoal. The filter is then heated to the proper temperature by opening the steam-cock F, the entering steam in the same time expelling the volatile sal-ammoniac of the charcoal through the lower air-cock, O. By opening the supply-cocks D and I of the standing pipe B and the air-cock U, the boiling solution of sugar is introduced through the pipe C into the filter A, and the latter, having been previously heated, will not cause any material change or fluctuation of the specific gravity of the boiling liquid after its entrance. The connection of filter A with the filter A' is now established by the connecting-pipe and stop-cock E and the glass tube T. Consequently, by opening the cocks K, I', and U' upon filter A', the liquid from A will assume its level in A' after having passed through the filter A. When sufficiently filled, the cock E' in the vertical connecting-pipe of filter A' is opened, and the filtration, after having passed the second filter and the extra small sponge filter S, will find an outlet at G' and a further discharge through the channel H into the reservoirs of the vacuum apparatus.

The two filters A and A', thus started, usually work but a certain length of time without interruption, as the sediments and fibrous matters contained in the solution of the raw sugar will soon accumulate and firmly settle upon the upper strainer in filter A. It then becomes necessary to remove such impediments, and this is simply effected by shutting off the supply at D and by admitting steam through the cock F upon the surface of the solution in filter A sufficiently long to force it about twelve inches below the strainer R, when the condensed water will free itself and float a few inches above the liquid. This being done, a reaction or back-pressure from filter A' is produced upon filter A—that is to say, from the bottom to its top—by opening the steam-cock F' and the cock K upon filter A', also the connecting-cock E with the air-cock U upon filter A, the supply-cocks D', L', I', and G G' having been shut again. The pressure of steam through pipe E will now force the solution upward in A, and all the sediments floating on its upper surface are removed by flowing off freely through the open cock U. Upon the reappearance of a clear and bright color of the solution the backward action of the filter A' is discontinued by the closing of F' and U, and the forward and direct-acting filtration again takes place by the reopening of the cock I'. If the power and the properties of the charcoal are completely exhausted and the color of the liquid in the glass tubes T T', &c., indicates its perfect saturation, the supply-cock D is again closed, the cock L from the water-pipe opened, and the residue of the solution, by the aid of water, and steam from the cock F, is fully unsweetened and washed out. Finally it is carried off through M and the pipe N for further preparations. Filter A then is emptied at Q and recharged with a fresh supply of charcoal through the man-hole P, while by bringing the filter A'' in a similar relation to A' the same communications as already described are now established between A' and A'', and the process of filtration is thus carried on without interruption. Again, when A' is to be renewed, the cock K'' upon A and the connecting-pipes E'' combine the filter A'' with A, and the work is performed between the first and the third filter in a forward or backward direction, with an upward or downward pressure, and in precisely the same manner as already described and set forth.

What I claim as my invention, and desire to secure by Letters Patent, is—

The combination of a series or system of three or more filters with the herein described and specified arrangement of steam, water, and saccharine-juice pipes and their appurtenances, admitting of a continuous circulating motion of the liquid to be filtered from one filter into any of the others until a clear and fair filtration is obtained, and also admitting of the working of the filters backward or forward at pleasure, either from the top to the bottom or in the opposite direction, for the purpose of partially reviving the purifying properties of the charcoal until fully exhausted, as herein set forth.

CHARLES E. BERTRAND.

Witnesses:
 CHARLES EHMAN,
 G. SCHMIDT.